United States Patent [19]

Currie

[11] 4,093,438

[45] June 6, 1978

[54] METHOD OF MAKING LAMINATED WINDSHIELDS

[75] Inventor: Robert M. Currie, Dearborn, Mich.

[73] Assignee: Ford Motor Company, Dearborn, Mich.

[21] Appl. No.: 846,654

[22] Filed: Oct. 28, 1977

[51] Int. Cl.² .............................................. C03B 23/02
[52] U.S. Cl. ......................................... 65/62; 65/56; 65/105; 65/106; 65/112
[58] Field of Search .................. 65/56, 62, 99 A, 105, 65/112, 113, 158, 106, 107, 158

[56] References Cited

U.S. PATENT DOCUMENTS

| | | | |
|---|---|---|---|
| 2,932,129 | 4/1960 | Alexander et al. | 65/105 |
| 3,506,425 | 4/1970 | Currie | 65/105 X |
| 3,554,722 | 1/1971 | Harvey et al. | 65/62 |
| 3,639,112 | 2/1972 | Poola | 65/158 X |
| 3,841,857 | 10/1974 | Harcuba | 65/99 A |

*Primary Examiner*—Arthur D. Kellogg
*Attorney, Agent, or Firm*—William E. Johnson; Keith L. Zerschling

[57] ABSTRACT

A method of making laminated windshields is disclosed. Brackets of glass of oblong shape are cut from a continuous glass ribbon manufactured by a "Float" process in such a manner that the brackets have drawlines associated therewith running across the shorter dimension of the bracket. The brackets are cut, formed into pairs, bent as pairs, and laminated as pairs to produce completed windshields which have the drawlines of the glass aligned vertically, i.e., in the direction from the top to the bottom of the finished windshield. This orientation of the glass reduces the drawline distortion observable when the windshield is in place in the vehicle.

1 Claim, No Drawings

METHOD OF MAKING LAMINATED WINDSHIELDS

BACKGROUND OF THE INVENTION

In a float process of manufacturing a ribbon of glass, molten glass is poured out on a molten tin bath and allowed to flow out. If no forces are applied to the glass, it will flow to an equilibrium thickness of about one-quarter of an inch. However, in order to manufacture thinner glass by the float process, it is necessary to apply stretching forces to the ribbon to draw it down to a thickness less than equilibrium, for example, 0.095 inches.

As is well known in the art, the principal stretching force is applied along the length of the ribbon of glass being formed in a float chamber in order to draw it down to thicknesses less than equilibrium thickness. This stretching force intensifies the drawlines which are visible upon close inspection of the finished float glass. These drawlines are readily visible when one skilled in the art looks through the glass. They can most readily be seen when the glass is placed at an angular relationship with the scene viewed. The drawlines are observable as slight, essentially parallel optical distortions in the appearance of the subject viewed.

U.S. Pat. No. 3,486,673 issued to J. G. Madge for a Method of Cutting Glass, describes generally a method for cutting a glass ribbon manufactured in a float glass operation into individual glass brackets. In order to produce such brackets, the glass ribbon must be cut across its width and along its length. The cross-cuts are made by cross-cutting machines which are generally of complex design because the machine must move in coordinated fashion with the ribbon so that it may compensate for the ribbon's movement in a direction perpendicular to its cutter travel path.

Cuts are made along the length of the ribbon of glass by machines which have been called cord-wood cutters. These stationary machines are of much simpler design because the glass ribbon can move relative to them and because the direction of cut parallels the direction of glass travel.

It has been customary in the industry to use the cross-cutting machines to cut the glass ribbon initially into large individual blocks of glass. Thereafter, the large individual pieces of glass are cut in the opposite direction by the cord-wood cutters into a plurality of oblong glass brackets. In this situation, the most cuts are made on the less complex cord-wood cutter; thus, the drawlines in the glass ribbon, which lie parallel to the direction of movement of the glass, will also lie parallel to the greatest dimension or length of the glass bracket.

When these glass brackets, having the drawlines running along the greatest dimension, are cut into windshield shapes, paired with another bracket to form a pair of glass brackets for a windshield, bent as a paired unit and laminated as a paired unit to form a windshield, certain optical problems can develop. In particular, I have found that the optical problem which the disclosure addresses is one in which the drawlines in the completed windshield are conventionally aligned in the horizontal direction. This occurs because the largest dimension of the glass bracket, and the one to which the drawlines lie parallel, is the dimension which winds up extending across the windshield essentially from one side of the windshield to the other side.

The alignment of the drawlines can result in recognizable distortions of the true external scene when the viewer looks through the windshield with the vehicle in motion. This is because the essential up and down action of the moving vehicle relative to the occupant and to the scene causes the line-of-sight between the viewer (occupant) and the scene to pass successively through a variety of adjacent places in the interposed windshield. These places may alter the scene more or less depending on the presence and degree of floatline distortion existing at each of the (instant) light paths through the windshield.

Such distortions are generally minimal and not generally detected by those who are unskilled in the art. However, they can be detected by skilled artisans and even by observant lay people. It is our desire to produce the very best quality windshields, recognizing that drawlines are inevitably present in some degree in glass manufactured by the float glass process.

I have discovered that if the drawlines of the float glass ribbon are oriented in the windshield in the vertical direction, the eyes of the driver and/or passenger in the vehicle are not moved across the drawlines upon up and down motion, but are moved essentially parallel thereto. This action substantially reduces to a skilled artisan the distortion of the windshield. It is more difficult to make the windshield in this manner because the machine which cross-cuts the glass ribbon now has to be used to make the greater number of cuts because the large dimension of the glass bracket will be perpendicular to the center line of the glass ribbon rather than parallel thereto. This is a more difficult and more costly operation to make the greater number of cuts on the cross cutting machine rather than a cord-wood machine which is the conventional practice. It is additionally more difficult because the maximum available width of the glass ribbon in a given floatline installation may be such as to constitute a constraint on its capability of yeilding efficient full lengths or multiples thereof across the (ribbon) direction of the motion of the glass as proposed herein.

SUMMARY OF THE INVENTION

This invention relates to a method of making laminated windshields and, more particularly, to a method of making laminated windshields from a glass ribbon manufactured by the float process.

In accordance with the general teachings of the method of this invention, a glass ribbon is manufactured by the float process in which molten glass is flowed out upon a molten metal bath to deliver at the exit a ribbon of glass. The ribbon of glass is stretched by applying stretching forces to a thickness less than an equilibrium thickness. The ribbon of glass is removed from the molten metal bath and annealed. This glass ribbon develops drawlines therein essentially parallel to the direction of movement of the ribbon over the metal bath because of the stretching forces applied thereto.

In accordance with the method of this invention, oblong glass brackets are cut from the glass ribbon in a manner that the drawlines run across the shorter dimension of the bracket. The so-shaped rectangular glass brackets are subsequently cut into windshield shaped articles. Pairs of windshield shaped articles are formed. These pairs of windshield shaped articles are bent to a final windshield configuration. After bending, the pairs of windshield shaped articles are laminated together to produce complete windshields in which the draw lines of the glass are aligned in a top to bottom direction. When the windshields manufactured by the method of this invention are installed in an automobile or other vehicle, the drawlines are aligned in the vertical direction, thereby reducing the distortion produced by the relative up and down movements of a driver or passenger of the vehicle with respect to the interposing glass and the subjects in view.

DESCRIPTION OF THE PREFERRED EMBODIMENT

Most flat glass manufactured in the United States is made by the float process. In general, this process involves pouring molten glass onto a molten metal bath housed in a float chamber. The molten glass flows out upon the bath to an equilibrium thickness which is determined by the temperature of the glass and physical forces such as surface tension between the molten metal and the molten glass. In general, an equilibrium thickness is about one-quarter of an inch. In order to make the glass thinner than equilibrium, longitudinal stretching forces are applied to the glass as its temperature is controlled. The glass is much like taffy at the manufacturing temperature and it stretches out to form a thinner ribbon of glass. Primarily, the stretching forces are applied to the glass from a point near the exit end of the glass manufacturing chamber. The stretching forces act on the glass and the glass is thinned out.

The thinning out of the glass as a result of the longitudinally applied stretching forces results in the manufacture of a glass ribbon having drawlines therein which extend in the direction of movement of the glass through the chamber, namely, along the length of the ribbon of the float glass. The manufacture of float glass and its stretching are well known to those skilled in the art.

In past commercial practice, the so-manufactured ribbon of glass having drawlines therein was cut across its width to form large blocks of glass, these large blocks being cut by a second cutter into individual oblong glass brackets. In general, the cross cut defines the large blocks of glass and the second cutting or cord-wood cutting defines the smaller oblong brackets of glass. The cord-wood cutting was along the length of the large blocks of glass and resulted in the smaller oblong brackets of glass having the drawlines extending along the largest dimension thereof.

As is well known in the art, the oblong glass brackets are cut in order to form a windshield shaped article. Two of the so-formed windshield shaped articles are placed together for the purpose of forming a single windshield. As is well known to those skilled in the art, the windshield shaped article which is to be on the inside of the windshield is generally smaller in dimension than the windshield shaped article which is to form the exterior of the windshield. This is to accommodate for the changes of relative length encountered in the bending of the glass.

As is well known in the art, the paired windshield shaped articles are bent together in the same mold. The purpose of this is to permit the simultaneous bending of the two windshield shaped articles so that they provide an intimately matched pair which may subsequently be laminated.

After bending, the two windshield shaped articles are separated from each other and a laminating interlayer is placed therebetween. The two windshield shaped articles with the laminating interlayer therebetween are then laminated to form a windshield. Commercially, because of the way in which the glass brackets were previously cut, the windshield brackets had the drawlines running along the longest dimension thereof. When such were assembled into windshields, of course, the long direction turned out to be the horizontal direction. This means that drawlines are running horizontally across the windshield when in its installed position.

With drawlines oriented in a horizontal position, those who can discern such drawlines are bothered by distortion when they operate or ride in a motor vehicle containing such a windshield. This occurs because during operation of the vehicle the interposed windshield moves up and down between the eyes of the viewer and the scene being viewed. This movement causes the eyes to move over the pattern of horizontal drawlines thus causing the visual distortions.

I have discovered that if the drawlines are oriented in the vertical direction rather than the horizontal direction, they are not as bothersome to a person having an acute visual perception of distortion. By orienting the drawlines in the vertical direction, the eye movement is parallel to the direction of the drawlines rather than perpendicular thereto. Thus, notice of such drawlines is substantially reduced.

Therefore, in accordance with the teaching of the method of my invention, the glass cut from a float glass line is cut so that the oblong glass brackets from the glass ribbon are formed in a manner that the drawlines run across the shorter dimension of the brackets. In this manner, when the brackets are cut, formed into pairs, bent and laminated, the drawlines in the final product extend from the top of the windshield to the bottom thereof rather than across the long dimension.

Cutting oblong brackets with the drawlines running across the shorter dimension, requires the reversing of the roles of the cross-cutter and the cord-wood cutter from the commercial practice which has been described above. In other words, the length dimension of the bracket is defined by the cross-cutter and the width dimension is defined by the cord-wood cutter, which is a reverse of the roles described above.

Many obvious modifications of this method may be made by those skilled in the art in view of this specification. It is intended that all such modifications be included within the scope of the appended claims.

What I claim is:

1. A method of making windshields from a glass ribbon manufactured by a float process in which molten glass is flowed out upon a molten metal bath to form a ribbon of glass, wherein the ribbon of glass is stretched by longitudinally applied stretching forces to a thickness less than an equilibrium thickness, and wherein the ribbon of glass is removed from the molten metal bath and annealed, the glass ribbon developing drawlines therein in the direction of movement of the ribbon over the molten metal bath because of the stretching forces applied thereto, which method of making windshields comprises the steps of:

cutting oblong glass brackets from said glass ribbon in a manner that the drawlines run across the shorter dimension of the bracket;

cutting the so-formed glass brackets into windshield shaped articles;

forming pairs of windshield shaped articles;

bending said formed pairs of windshield shaped articles to a final windshield configuration; and laminating formed pairs of the so-bent windshield shaped articles to produce completed windshields which have the drawlines of the glass aligned in the top to bottom direction.

* * * * *